United States Patent [19]

Glaser et al.

[11] Patent Number: 5,081,552
[45] Date of Patent: Jan. 14, 1992

[54] RIGID MAGNETIC DISK DRIVE HEAD DISK ASSEMBLY AND ENCLOSURE STRUCTURE

[75] Inventors: Thomas W. Glaser; Richard Greenberg; Nigel F. Misso; Robert E. Schopp, all of Rochester, Minn.

[73] Assignee: International Business Machines Corporation, Armonk, N.Y.

[21] Appl. No.: 304,996

[22] Filed: Jan. 31, 1989

[51] Int. Cl.$^5$ ............................................. G11B 17/02
[52] U.S. Cl. ................................................. 360/98.01
[58] Field of Search ................ 360/98.01, 97.03, 98.07

[56] References Cited

U.S. PATENT DOCUMENTS

| | | | |
|---|---|---|---|
| 4,491,888 | 1/1985 | Brown et al. | 360/98.07 |
| 4,577,240 | 3/1986 | Hedberg et al. | 360/98.01 |
| 4,714,972 | 12/1987 | Biermeier et al. | 360/97.03 |
| 4,835,637 | 5/1989 | Mach et al. | 360/98.01 |

FOREIGN PATENT DOCUMENTS 63-127482  5/1988  Japan ................... 360/98.01

Primary Examiner—Robert S. Tupper
Attorney, Agent, or Firm—Robert W. Lahtinen

[57] ABSTRACT

A structure and organization for a magnetic disk drive provides for optimizing the volumetric storage density within a device form factor by optimizing the number of disks. The spindle and dual rotary actuators are respectively supported at each side by a pair of support plates that are separated and supported by not only the spindle and actuator shafts, but also the voice coil motor core pieces and tie plates which carry shock mounts. This head-disk assembly is shock mounted in the lower part of a two part enclosure wherein the enclosure parts are aligned and separated by elastomer guides and the separation covered by a compliant tape to complete the enclosure. Both actuators use a common servo surface while one actuator carries upwardly facing transducers and the other downwardly facing transducers so that each arm extending between disks mounts, but a single suspension-transducer assembly to reduce interdisk spacing. The enclosure occupies the entire vertical height of the form factor and the head-disk assembly occupies the full available height of the enclosure interior to accommodate as many disks as possible. Electrical components are excluded from the axial sides of the stack of disks.

13 Claims, 5 Drawing Sheets

RIGID MAGNETIC DISK DRIVE HEAD DISK ASSEMBLY AND ENCLOSURE STRUCTURE

FIELD OF THE INVENTION

This invention relates to magnetic disk storage devices and more particularly to a structure and arrangement of such a device that enables optimization of the volumetric storage capacity within a predetermined form factor or specific set of physical dimensions.

BACKGROUND

State of the art magnetic disk drive frames generally are castings or plates on which spindle and actuator assemblies are cantilever mounted. A variation of this approach is the addition of a second L-shaped or C-shaped member for providing support to the other end of the actuator or spindle shaft. Yet another version is a 'cake pan' style casting into which the spindle and actuator assemblies are mounted. A thin sheet metal part closes the end of the cake pan while providing support for the opposite ends of the spindle and actuator shafts. A planar board of associated electronics is mounted to the user frame underlying the head-disk assembly and using the full length and width dimensions of the device to complete the electro/mechanical file assembly.

To achieve the maximum storage capability of a magnetic disk data storage device, the areal density of data written on the data surface is maximized by using the highest possible track density and the greatest bit density within each track. The real objective is to obtain the maximum volumetric density within the device which requires that the available space contain the maximum number of storage disks in addition to optimum areal density. Disk drive dimensions are normally limited by a form factor or an industry standard set of length, width and height dimensions. This is a rigid standard that is often more the result of accident than design. The standard is usually the result of a progression of events starting with a flexible disk drive, that sets the standard or in accordance with which using systems provide space in their designs. Rigid disk drives have usually been adapted to replace a flexible disk drive in the same space and have therefore been required to meet the same or standard dimensions in order to obtain acceptance from the users of such storage devices. Drives incorporating 3½ inch disks have a form factor that is 5.75 inches long, 4 inches wide and 1.625 inches high.

Disk storage devices are particularly susceptible problems arising from uneven clamping or securing forces. In most environments, securing parts at multiple locations avoids problems. However, in a device such as a disk drive, microinch differences cause performance problems infrequently experienced elsewhere. For example, clamping disks on a spindle using a symmetrical pattern of 5 or 6 bolts with a rigid clamping member usually results in localized stress art each bolt location that results in a small localized displacement of the disks at each clamping site. Even minuscule displacements of this nature must be addressed by the track follow technique to avoid error propagation. Similar problems are encountered when a drawn sheet metal cover is clamped or bolted to a base casting on which the head-disk assembly is supported. Small, but meaningful localized displacement of what appears to be a rigid frame must be accommodated to achieve error free write and read operations.

SUMMARY OF THE INVENTION

The present invention is directed to a magnetic disk drive structure and organization that is calculated to enhance and optimize the volumetric storage density within the limitations of a given form factor. In the preferred embodiment, the head-disk assembly including rotary actuators and a spindle are mounted between two parallel plates that are separated and supported by other structural elements of the assembly. Interconnected between the plates are the spindle shaft, actuator shafts, voice coil motor core elements and tie bars which combine to create a rigid, integrated frame structure.

The plates have ribs that provide rigidity with the ribs on one plate predominantly oriented at a 90 degree displacement with respect to the ribs on the other plate. Supporting both ends of the spindle and actuator shafts by common structural members that are themselves rigidly fastened together provides a symmetrical inter-relationship between spindle and actuator that minimizes DC offsets, moves resonant frequencies to a more easily managed higher level, and blunts the energy of those resonances. The two plate approach provides an efficient utilization of the volume necessary for providing the function of a rigid frame. Excess volume, as a result of this approach, is used for additional disks which in turn results in a higher file volumetric density and storage capacity. This approach also allows the assembly of components to the lower plate and the merge operation of the actuator to the spindle to occur without the encumbrance of other frame members while the top plate is added as the last operation in the assembly of the head-disk assembly.

The arrangement of the drive mechanical components in the present invention provides a file enclosure that has combined or multiple functions including provision of a barrier preventing entry of contamination into the file; means for a user to mount the file; shock mounting to isolate the head-disk assembly from the enclosure and mounting of the associated electronics. These functions are provided while eliminating the customary user frame. The head-disk assembly is completed and tested independent of the cover/enclosure and is thereafter shock mounted to the lower half of the cover system.

The enclosure for the head-disk assembly is formed of two cover elements, a lower element in which the head-disk assembly is shock mounted and an upper element that substantially completes the enclosure. The two cover elements have aligned edge surfaces that are located and maintained in a separated position by elastomer guides. The sealing of the enclosure is completed by a thin compliant tape that closes the gap between the cover elements. A thin compliant metal tape can be used to maintain the continuity of shielding provided by the cover system. By enclosing the head-disk assembly with a cover system that avoids clamping or bolting cover elements together or bolting or clamping a drawn cover to a frame carrying the drive assemblies, no forces are introduced that may impart stress and distortion to the mechanical system.

By designing the enclosure to occupy the full form factor height of the drive and the head-disk assembly to utilize the full height available within the enclosure, the number of disks available and volumetric density can be optimized. This requires that the electronic components that must be included in the drive exterior to the head-disk assembly be excluded from the regions axially above and below the disk stack. Volumetric density is also enhanced by using minimum spacing between adjoining disks which is enhanced by the actuator design of the present invention which mounts only a single suspension-transducer assembly on each actuator arm.

DETAILED DESCRIPTION

Figure 1:
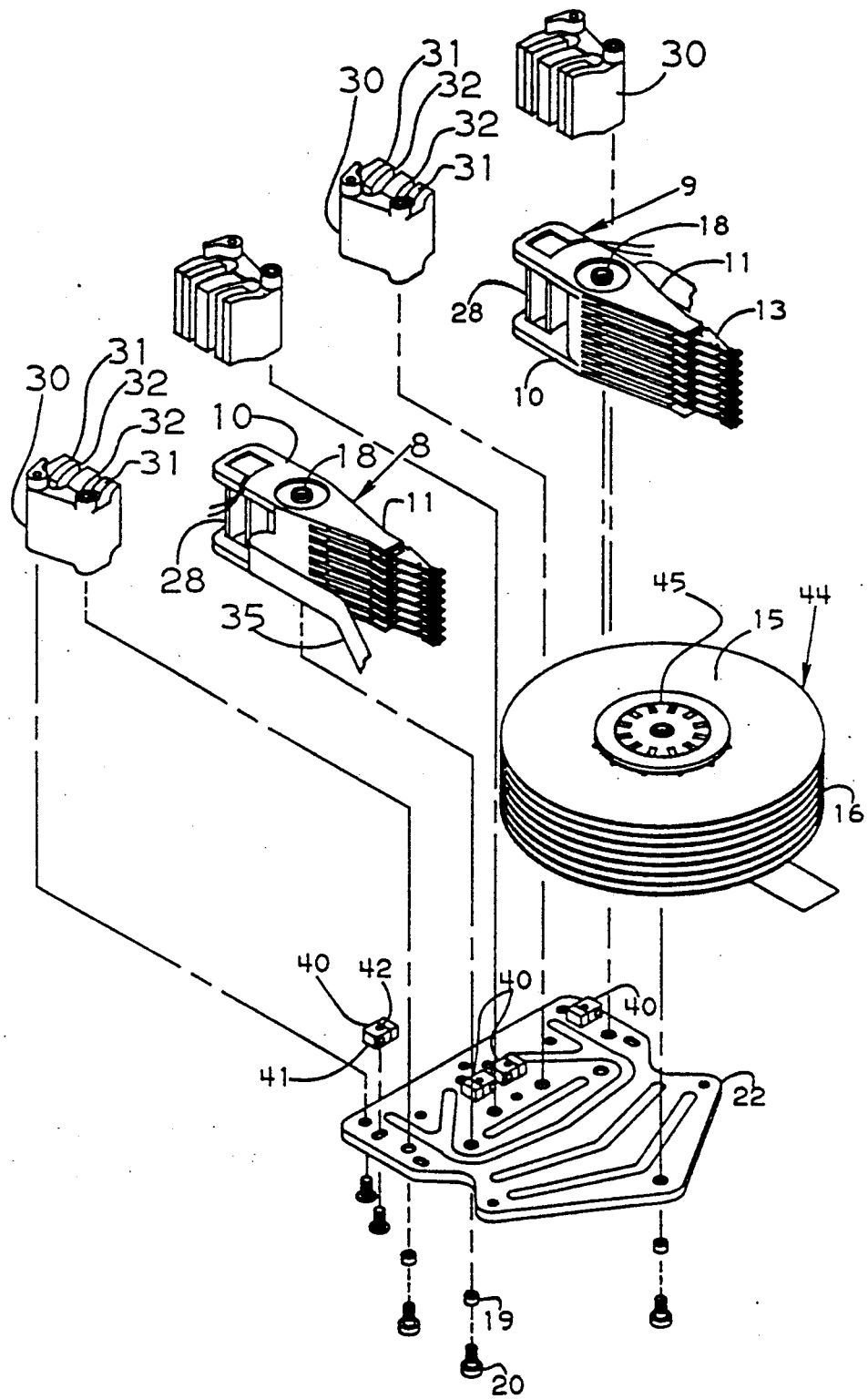
FIG. 1 is an exploded view of the disk drive of this invention including disk and actuator assemblies, crash stops and the lower plate.

FIG. 1 is an exploded view showing the actuator arm assemblies 8 and 9, each including a body 10 with a comb portion that presents a series of arms 11 which support transducer/suspension assemblies 13. The arms 11 that extend over the uppermost data surface 15 of the stack of disks 16 each carry a downwardly facing transducer or servo head that reads the servo data on the upper surface 15 for positioning the respective actuator during access from track to track and track follow during read or write operations. Actuator 8 has a suspension and a downwardly facing transducer mounted on each arm 11 to respectively provide read write access to the associated disk upper surface. Actuator 9 has one suspension and an upwardly facing transducer mounted on each, except the uppermost, arm 11 and suspension to read data from and write data to the respective disk lower surfaces. Thus the servo data is used by both actuators 8 and 9, but the data surfaces are exclusive to one of the two actuators. Having only one suspension/transducer assembly 13 supported on each arm 11 contributes to reducing the spacing between disks and enables more disks to be used within the vertical height limitation of the form factor.

Figure 2:
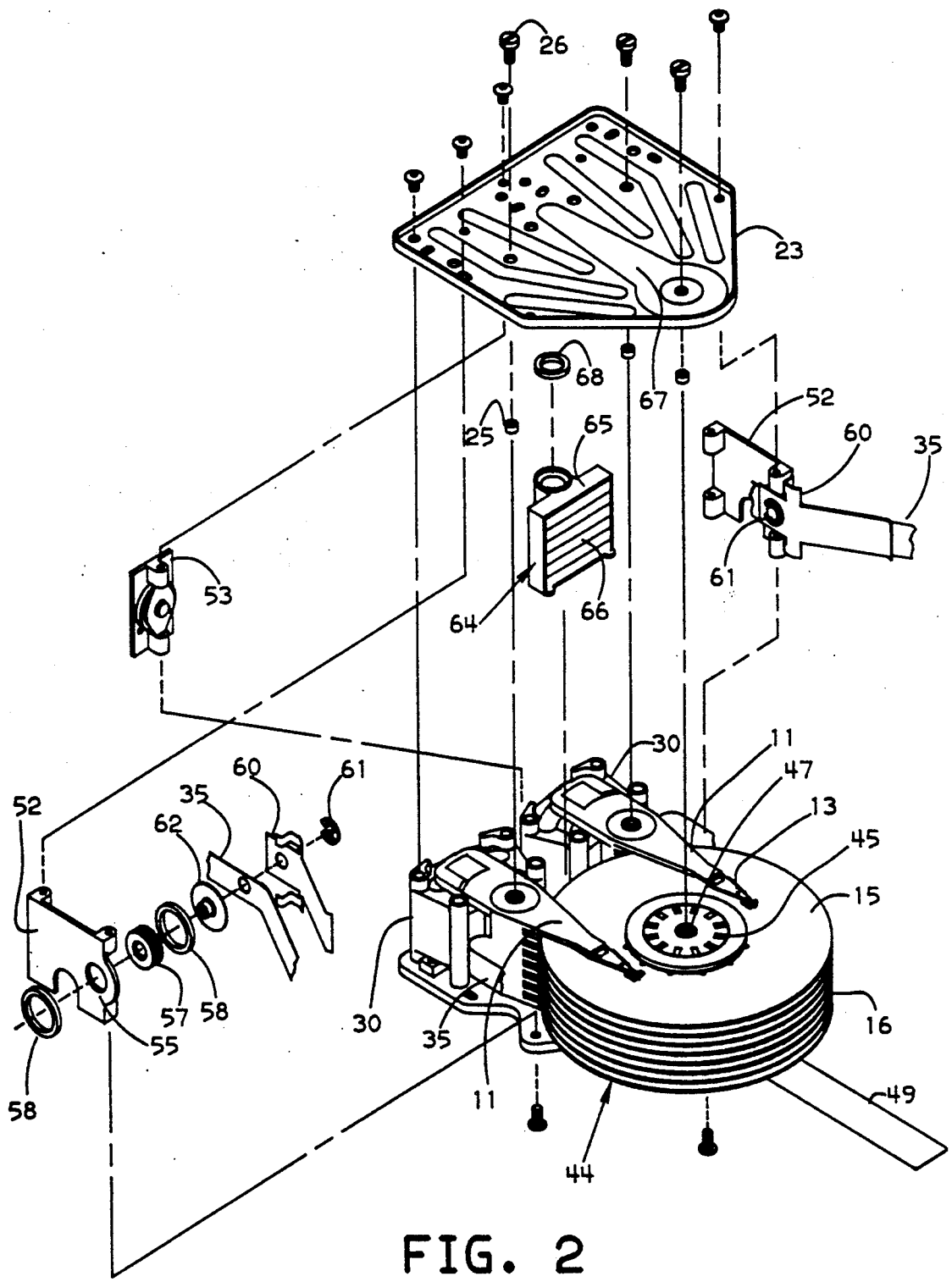
FIG. 2 is an exploded assembly of the drive of FIG. 1 with the disk stack and actuator merged and including further elements of the head-disk assembly (HDA).

Each actuator pivots about a pin 18 which is secured by a sleeve 19 and a shaft screw 20 to bottom plate 22 and (as seen in FIG. 2) by a similar sleeve 25 and shaft screw 26 to the top plate 23. The pins 18 establish the pivot axis about which the actuators 8 and 9 rotate to move the transducers from one track location to another track location or to track follow during read and write operations. At the opposite side of the pivot axis is a voice coil 28 that provides the armature of the voice coil motor used to drive the actuator. Each actuator has a pair of core assemblies that are formed of magnetically permeable material, include permanent magnet portions and form an air gap in which the vertical portions of the voice coil portions that are parallel to the axis of rotation are received in a magnetic field. A flat cable extends from each actuator which contains the conductors that connect the voice coil motor and transducers to the various power, control and data circuits outside the head disk enclosure. A series of crash stops 40 are bolted to the bottom plate 22. Each of the four crash stops is positioned to limit travel of one of the rotary actuators 8 and 9 in one pivotal direction. Each crash stop 40 has a metal body 41 and a resilient layer 42 attached to the surface that may be engaged by the actuator.

The spindle assembly 44 also includes a plurality of disks 16 separated by spacers (not shown) and mounted about a hub 45 that also serves as the rotor for the in-hub motor concentrically mounted radially inward of the disks. The stator assembly is connected through the opening 47 to a top plate 23 (FIG. 2) and at the lower axial end of the spindle assembly to the bottom plate 22. A flat cable 49 extending from the lower portion of the spindle motor provides the power and commutation control to the spindle motor stator windings.

Each of the ties bars 52, 53 present an opening 55 through which is supported a shock mount 57 with a mount seal 58 at either side. The left and right tie bars 52 also include a cable guide 60 which is retained by a clip 61 that attaches to the opposite side of the mount nut 62. This clip 60 confines and provides strain relief for the respective flat cables 35 from the actuators 8, 9.

This series of interconnecting elements in cooperation with the top and bottom plates 22, 23, functions as a very rigid integrated frame structure that captures both ends of the shafts that establish the axes of rotation for the spindle assembly 44 and actuators 8, 9 and maintains the the center to center distance between these axes at each and of the shafts. This constraint reduces or eliminates the base bending problems that cause the axes to become nonparallel and introduces problems of thermally induced track misregistration.

Bottom plate 22 (FIG. 1) and top plate 23 (FIG. 2) are structural sheet metal plates that have embossed ribs 67, 69, 71. The ribs 67, 69 in top plate 23 are predominantly disposed in one direction while the lower plate 22 has ribs or embossments 71 that extend in a direction predominantly 90 degrees displaced with respect to ribs 67, 69. The directions that the ribs extend were chosen to provide rigidity, including torsional rigidity, in all directions for the frame. A formed lip or flange 74 borders the periphery of each of plates 22 and 23 and affords added rigidity.

Also shown in FIG. 2 is an air filter 64 in the form of a cartridge 65 that is supported between the top and bottom plates 22, 23 and has an inlet through the extended surface filter media 66. The outlet of the filter cartridge communicates with a channel in the top plate 23 formed by attaching a cover to the embossment 67 with seal 68 maintaining the integrity of the passage between cartridge entrance and the channel outlet that overlies the axis of the spindle. Top plate 23 and bottom plate 22 may be either cast and machined or stamped from sheet metal and provided with embossments as shown to enhance the rigidity.

The head disk assembly (HDA) 70 formed by the top plate 23, bottom plate 22 and the elements secured therebetween affords an assembly that permits a maximum number of rigid magnetic disks 16 to be positioned within a predetermined height. The top and bottom plates have minimum thickness required to maintain rigidity and require a minimum extension beyond the axial length of the spindle assembly. The use of actuators with single suspension/transducer assemblies 13 on each arm 11 enables reduced spacing between disks.

Figure 3:
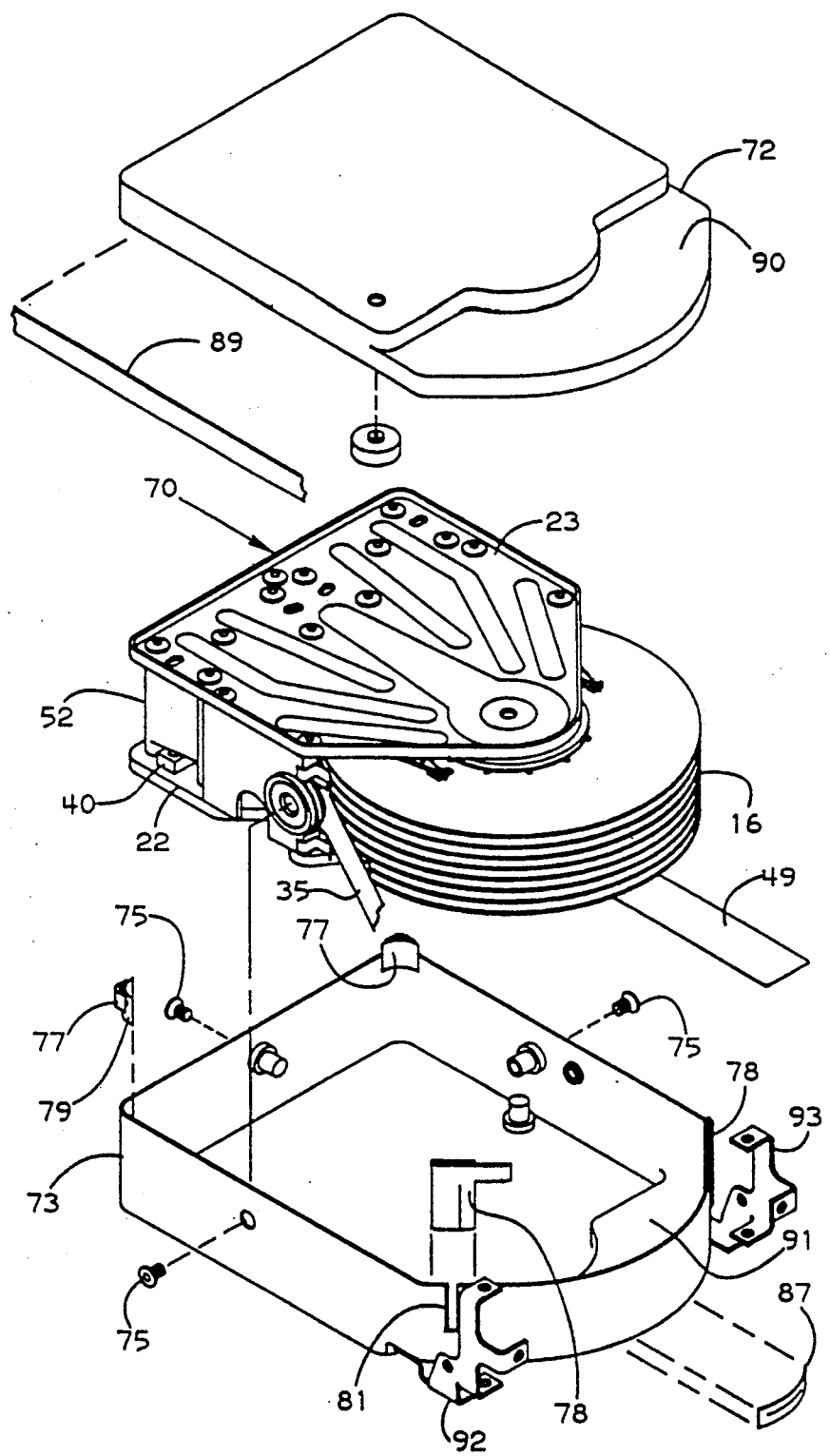
FIG. 3 is an exploded view of the drive of FIG. 1 with the HDA assembled and further showing the enclosure elements the surround and seal the HDA.
Figure 5A:
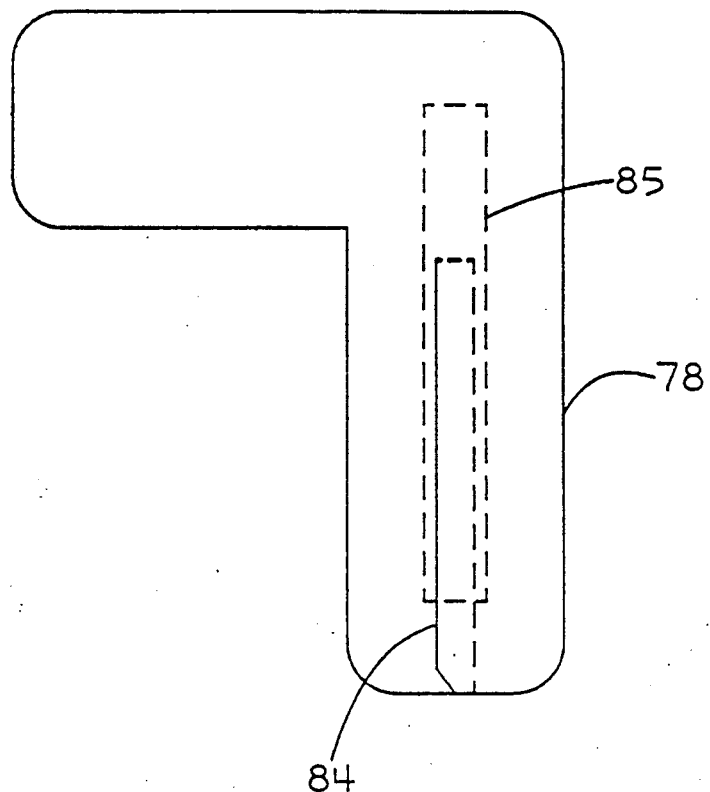
FIGS. 5A and 5B are detail drawing illustrating the structure of the elastomer rear guide members.
Figure 5B:
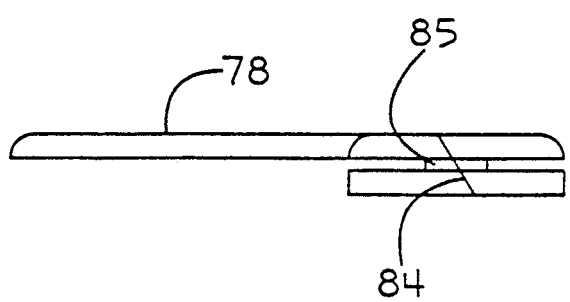

FIG. 3 illustrates the mounting of the HDA 70 within the upper and lower cover elements 72, 73 respectively. Three shock mount screws 75 cooperate with the shock mount assemblies carried by the tie bars 52, 53 of the HDA 70 to provide a shock mounted support for the HDA within the lower cover element 73. The cover elements 72, 73 are sheet metal that is deep drawn to form the desired configurations. Separation and positioning of the covers is accomplished by rubber like molded guides 77, 78. The guides 77, 78 contain opposing groves that locate one cover element to the other. The grooves in the guides are separated by a molded wall that, in turn, separate the cover elements. The pair of corner guides 77 have a curved surface 79 that matches the cover elements interior corner surface configurations. These guides 77 in performing their function of positioning the cover elements, are themselves, by virtue of the curved shape, located by the cover elements. The two rear guides 78, with left and right configurations, have opposing grooves and a wall 85 separating the grooves similar to the corner guides 77 and perform the same cover element separating and locating functions. These guides are trapped to the lower cover 73 by sliding into slots 81 in the lower cover and have a narrow slot or angled cut 84 through the wall 85 that is received in the slot 81 which allows the actuator flat cable 35 to exit the cover assembly. FIGS. 5A and 5B show the detail of the rear guide member with the wall portion 85 received in the cover element slot and the slot or cut 84 provided to enable the actuator flat cable 35 egress from the cover enclosure. A motor cable passthrough is afforded by an elastomer seal 87 that fits about the motor cable 49 and seals a slotted opening in the lower cover element wall (not shown) through which the cable passes.

Securing the cover elements together and sealing the gap between the cover elements is a conformable tape 89 having adhesive on one side. A conformable metal tape may be used if electromagnetic radiation presents a problem. Each of the cover elements 72, 73 has a reduced height end surface 90, 91 respectively over the portion of the disk stack which is beyond the top and bottom plates 23, 22 and beyond the space required by the transducer assemblies 13. A pair of brackets 92, 93 are attached to the lower cover element 73 and used to support the electrical components of the drive which are exterior to the enclosed head disk assembly.

Figure 4:
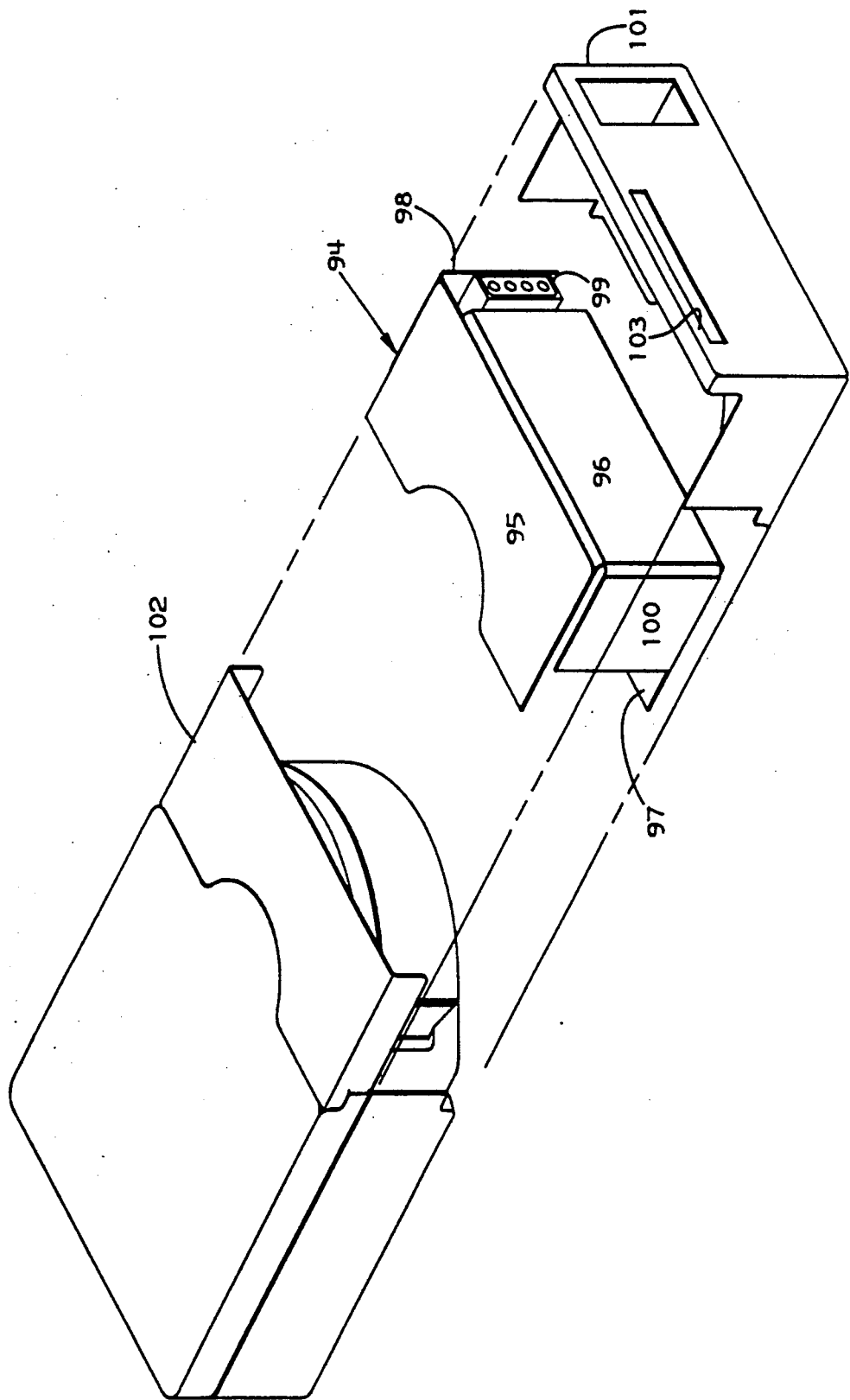
FIG. 4 is an exploded view showing the mounting of electronic components exterior of the HDA and within the form factor.

FIG. 4 is an exploded view of the drive showing the electronic component attachment to the head-disk enclosure within the form factor dimensions. The electronic components are mounted on a folded flex circuit assembly 94. The flex circuit assembly is of generally U-shaped form with top wall portion 95, rear wall portion 96 and bottom wall portion 97, an end 98 which carries power connector 99 folded from the top wall portion 95 and the opposite side wall 100 folded from the rear wall portion 96. A two piece sheet metal enclosure having a body 101 and top 102 surrounds the flat cable electrical assembly 94 to provide mechanical support and thermal conductivity. The metal enclosure is attached to the head-disk enclosure by the brackets 92, 93 (FIG. 3). The opening 103 in enclosure body portion 101 enables an interface connector mounted on the flex cable rear wall 96 to interconnect the drive to the using system.

The volumetric storage density of the disk drive is maximized by having the upper and lower surfaces of the head disk assembly covers separated by the full vertical dimension of the form factor while the head-disk assembly uses the full vertical height within the cover assembly with only enough clearance provided to accommodate the vertical sway space required by the shock mounting.

What is claimed is:

1. A magnetic rigid disk storage device, contained within a form factor that predetermines the length, width and height of said device, comprising
   a plurality of hard disks mounted on a spindle for rotation in unison;
   rotary voice coil actuator means which pivots about the axis of an actuator shaft and carries magnetic transducers, each adapted to be moved from one track location to another track location with respect to an associated disk data surface;
   supporting means for rotatably supporting said spindle and supporting said actuator shaft;
   said support means comprising a pair of parallel plate members each of which supports one end of said spindle and one end of said actuator shaft, said support means further including voice coil motor core elements that are rigidly connected to each of said parallel plate members;
   said plate members being formed of sheet metal with elongated embossments one one of said plates extending in a direction predominantly 90 degrees displaced with respect to the embossments on the other of said plates;
   motor means for rotating said disks, which is supported by said support means and is mounted coaxially with said spindle;
   shock mounting means for damping vertical and horizontal shock loading experience by said support means;
   enclosure means cooperating with said support means to enclose and substantially seal said hard disks and said actuator;
   the sum of the vertical dimensions of said spindle axial dimension, support means, enclosure means and the vertical sway space required by said shock mounting means occupying substantially the total height of said form factor; and
   device electrical components exterior of said enclosure means being mounted within said form factor radially outward from said plurality of disks.

2. The magnetic rigid disk storage device of claim 1 wherein said support means plate members each further include flanged margins.

3. The magnetic rigid disk storage device of claim 1 wherein said enclosure means comprises
   a two part cover with upper and lower parts having aligned edge surfaces;
   elastomer locating means that locate, align and maintain a separation between said upper and lower cover parts; and
   tape sealing means for continuously closing the separation between said upper and lower cover parts.

4. The magnetic rigid disk storage device of claim 3 wherein
   said actuator, said spindle with said hard disks and said support means form a head-disk assembly (HDA);
   said tape sealing means comprises a thin compliant metal tape; and
   said cover parts are drawn metal parts:
   whereby in the assembled condition said enclosure means provides a continuous metal shield surrounding said HDA.

5. The magnetic rigid disk storage device of claim 4 wherein said shock mounting means comprises a shock mounted connection of said HDA within said lower cover part.

6. A rigid magnetic data storage device comprising a spindle assembly which carries a plurality of disks for rotation in unison about the axis of said spindle assembly;

motor means mounted coaxially with respect to said spindle;

a rotary actuator pivotable about a second axis to move magnetic transducers carried thereby from one track location to another track location on an associated disk data surface;

a frame member having parallel wall portions which support both said spindle assembly and said rotary actuator at each axial end to form a head-disk assembly;

a two part cover means surrounding and sealing said head-disk assembly; and connecting means including plural shock mounting means, interconnecting one of said cover means and said head-disk assembly for supporting said head-disk assembly within said cover means.

7. The rigid magnetic disk data storage device of claim 6 wherein said cover means have aligned edge surfaces and said device further comprises elastomer guide means which maintain said cover edge surfaces in aligned, but separated orientation; and sealing means covering the separation between said cover means parts to enclose and seal said hard disk assembly within said cover means.

8. The rigid magnetic disk data storage device of claim 7 wherein said sealing means is a thin compliant tape.

9. The rigid magnetic disk data storage device of claim 8 wherein said sealing means is a thin compliant metal tape and said cover means is formed of drawn metal parts to form a continuous shielding enclosure about said head-disk assembly.

10. The rigid magnetic disk data storage device of claim 9 wherein the length, with and height of the device are predetermined by the dimensions of an established form factor, said cover means occupies the full vertical height of said form factor and said head-disk assembly occupies the full internal height of said enclosure means less a clearance that accepts the vertical sway of said shock mounting means.

11. The rigid magnetic disk data storage device of claim 10 wherein said cover means enclosed head-disk assembly occupies the full height and width of said form factor and said device further comprises an electrical component assembly exterior of said enclosure means positioned at one side of said disk stack and occupying the space between said cover means and the end of said form factor.

12. The rigid magnetic disk data storage device of claim 11 wherein said electrical component assembly is carried by a single flexible circuit assembly that is folded to support the electrical components mounted thereon in different planes.

13. The rigid magnetic disk data storage device of claim 12 wherein said single flexible circuit assembly least partially enclosed by metal wall surfaces that provide mechanical support and heat dissipation.

* * * * *